United States Patent
Heyse

(10) Patent No.: US 11,471,781 B2
(45) Date of Patent: Oct. 18, 2022

(54) SYNCHRONIZATION DEVICE HAVING A BASE STATION FOR SYNCHRONIZING HEAD-MOUNTED DISPLAYS WITH A VIRTUAL WORLD IN AN AMUSEMENT RIDE, AMUSEMENT RIDE HAVING A SYNCHRONIZATION DEVICE OF THIS TYPE, AND METHOD FOR OPERATING AN AMUSEMENT RIDE OF THIS TYPE

(71) Applicant: VR COASTER GMBH & CO. KG, Kaiserslautern (DE)

(72) Inventor: Michael Heyse, Mainz (DE)

(73) Assignee: VR COASTER GMBH & CO. KG, Kaiserslautern (DE)

( * ) Notice: Subject to any disclaimer, the term of this patent is extended or adjusted under 35 U.S.C. 154(b) by 39 days.

(21) Appl. No.: 16/980,643

(22) PCT Filed: Dec. 10, 2018

(86) PCT No.: PCT/EP2018/084226
§ 371 (c)(1),
(2) Date: Sep. 14, 2020

(87) PCT Pub. No.: WO2019/174769
PCT Pub. Date: Sep. 19, 2019

(65) Prior Publication Data
US 2021/0016192 A1   Jan. 21, 2021

(30) Foreign Application Priority Data

Mar. 16, 2018   (EP) ..................... 18162342

(51) Int. Cl.
*A63G 31/16*   (2006.01)
*A63G 7/00*   (2006.01)
*G06F 3/01*   (2006.01)

(52) U.S. Cl.
CPC .............. *A63G 31/16* (2013.01); *A63G 7/00* (2013.01); *G06F 3/012* (2013.01)

(58) Field of Classification Search
CPC .......... A63G 31/00; A63G 31/16; A63G 7/00; A63G 25/00; G09B 9/00; G09B 9/05; G06F 3/01

(Continued)

(56) References Cited

U.S. PATENT DOCUMENTS 5,490,784 A * 2/1996 Carmein ................ A63B 22/02
434/29
6,179,619 B1 * 1/2001 Tanaka ..................... A63G 7/00
434/307 R (Continued)

FOREIGN PATENT DOCUMENTS

CA   2932241 A1   2/2016
CN   103028252 A   4/2013

(Continued)

OTHER PUBLICATIONS

Canadian Office Action dated Oct. 5, 2021 corresponding to application No. 3093042.

(Continued)

*Primary Examiner* — Kien T Nguyen
(74) *Attorney, Agent, or Firm* — Nath, Goldberg & Meyer; Jerald L. Meyer; Stanley N. Protigal

(57) ABSTRACT

The invention relates to a synchronization device for synchronizing head-mounted displays (22) with a virtual world in an amusement ride (10), comprising at least one head-mounted display (22) with which a virtual reality can be represented, a base station (24) for storing the head-mounted display (22), the base station (24) having receiving means with which the head-mounted display (22) can be stored in a defined position and orientation in the base station (24), and a display position detection device (28) for detecting the position and orientation of the head-mounted display (22), the synchronization device (12) being set up in such a way that the virtual reality is synchronized with the head-mounted display (22), taking into account the position and orientation of the head-mounted display (22) detected by the display position detection device (28) in relation to the position and orientation of the head-mounted display (22) in the base station (24), as soon as the head-mounted display (22) is removed from the base station (24). The invention also relates to an amusement ride (10) having a synchronization device (12) of this type. The invention also relates to a method for operating an amusement ride (10) of this type.

17 Claims, 1 Drawing Sheet

(58) Field of Classification Search
USPC .................... 472/43, 59–61, 130; 434/62, 69
See application file for complete search history.

(56) References Cited

U.S. PATENT DOCUMENTS

| | | | |
|---|---|---|---|
| 2016/0346704 A1* | 12/2016 | Wagner | ................ G06T 19/006 |
| 2017/0072316 A1 | 3/2017 | Finfter | |
| 2017/0252658 A1 | 9/2017 | Reveley | |

FOREIGN PATENT DOCUMENTS

| | | |
|---|---|---|
| CN | 107037880 A | 8/2017 |
| DE | 102015100943 A1 | 7/2016 |
| WO | 2016/075674 A2 | 5/2016 |
| WO | 2016/189572 A1 | 12/2016 |
| WO | 2017153532 A1 | 9/2017 |
| WO | 2017/193043 A1 | 11/2017 |
| WO | 2018/012731 A1 | 1/2018 |

OTHER PUBLICATIONS

European Search Report dated Sep. 26, 2018, in corresponding European application No. 18162342.2.
Office Action dated Dec. 7, 2021 issued in corresponding Japanese Application No. 2020-549563.

* cited by examiner

SYNCHRONIZATION DEVICE HAVING A BASE STATION FOR SYNCHRONIZING HEAD-MOUNTED DISPLAYS WITH A VIRTUAL WORLD IN AN AMUSEMENT RIDE, AMUSEMENT RIDE HAVING A SYNCHRONIZATION DEVICE OF THIS TYPE, AND METHOD FOR OPERATING AN AMUSEMENT RIDE OF THIS TYPE

CROSS-REFERENCE TO RELATED APPLICATIONS

This is a National Phase Application filed under 35 U.S.C. 371 as a national stage of PCT/EP2018/084226 filed Dec. 10, 2018, an application claiming the benefit of European Application No. 18162342.2 filed Mar. 16, 2018, the content of each of which is hereby incorporated by reference in its entirety.

FIELD

The present invention relates to a synchronization device with a base station for synchronizing head-mounted displays with a virtual world in an amusement ride. Furthermore, the invention relates to an amusement ride having a synchronization device of this type. Furthermore, the invention relates to a method for operating an amusement ride of this type.

BACKGROUND

In particular, due to the increasing processor performance of computers and the increasing amount of data that can be transmitted wirelessly, the concept of virtual reality (VR) can be transferred to more and more areas of application. A special area of application is amusement rides which make it possible to combine movements that take place in virtual reality with real movements in a particularly extensive way, which results in a particularly extensive immersion and a correspondingly intense ride experience for the passenger. Amusement rides of this type are known, for example, from EP 2 138 213 B1, JP 2001 062 154 A, U.S. Pat. No. 6,179,619 B1 and EP 3 041 591 B1.

In order to make the virtual reality accessible to the passenger, head-mounted displays such as VR glasses are typically used, which in many cases communicate wirelessly with VR devices that generate the virtual reality. However, it is also quite possible that the VR device is integrated in the head-mounted display. The head-mounted displays are usually issued at the amusement rides to the passengers before the start of the journey and collected again after the journey has ended. The issue and collection of the head-mounted displays takes place at a station in the amusement ride, where the passengers get in and get out of the vehicle. After the passengers have entered the vehicle, the head-mounted displays must be synchronized with the virtual reality so that the virtual reality matches the current position and the current orientation of the head-mounted display and satisfactory immersion is ensured. Since the passenger places the head-mounted display on his head, the position of the head-mounted display corresponds to the position of the passenger and the orientation of the head-mounted display corresponds to the orientation of the head of the passenger.

With known amusement rides, synchronization is carried out by letting the passenger look in a certain direction, usually in the direction of travel, and in doing so starting the representation of virtual reality on the head-mounted display. The position and orientation of the head-mounted display during synchronization are used as a reference. The representation of virtual reality depending on the position and the orientation of the head-mounted display during the journey therefore relates to the position and the orientation of the head-mounted display during synchronization. The more exactly the actual position and that assumed by the VR device when generating the virtual reality and the orientation of the head-mounted display match, the higher the immersion. For this purpose, the passengers should focus on a certain point during synchronization, with their head held in the direction of travel. The exact orientation of the head during synchronization is of crucial importance. In order to achieve this, an explanation or instruction by the personnel is usually necessary. However, incorrect operations cannot be ruled out, which means that several synchronizations have to be carried out. As a result, the synchronization is associated with an increased personnel and time effort.

SUMMARY

It is therefore the problem of an embodiment and a design of the present invention to provide a remedy for the situation described above and in particular to create a synchronization device and an amusement ride with which a synchronization of a head-mounted display with virtual reality is made possible independently of the orientation of the passenger's head. In addition, a design of the invention is based on the object of providing a method which enables a head-mounted display to be synchronized with the virtual reality independently of the orientation of the head of the passenger.

This object is achieved with a synchronization device and method for synchronizing head-mounted displays with a virtual world, in particular in an amusement ride such as a roller coaster. At least one head-mounted display is provide, with which a virtual reality generated by a virtual reality (VR) device can be represented. A base station is used for storing the head-mounted display, and the base station has receiving means with which the head-mounted display can be stored in a defined position and orientation in the base station. A display position detection device detects the position and orientation of the head-mounted display. The synchronization is provided by a synchronization device, which is set up in such a way that the virtual reality is synchronized with the head-mounted display, taking into account the position and orientation of the head-mounted display detected by the display position detection device in relation to the position and orientation of the head-mounted display in the base station, as soon as the head-mounted display is removed from the base station.

One embodiment of the invention relates to a synchronization device for synchronizing head-mounted displays with a virtual world in an amusement ride, comprising at least one head-mounted display with which a virtual reality generated by a VR device can be represented, a base station for storing the head-mounted display, the base station having receiving means with which the head-mounted display can be stored in a defined position and orientation in the base station, and a display position detection device for detecting the position and orientation of the head-mounted display, the synchronization device being set up in such a way that the virtual reality is synchronized with the head-mounted display, taking into account the position and orientation of the head-mounted display detected by the display position detection device in relation to the position and orientation of the head-mounted display in the base station, as soon as the head-mounted display is removed from the base station.

In the proposed synchronization device, the head-mounted display is stored in a sufficiently defined position and with a sufficiently defined orientation in the base station. As a result, the actual position and the orientation of the head-mounted display assumed when the virtual reality was generated are completely the same. As soon as the head-mounted display is removed from the base station, the head-mounted display is synchronized with the virtual reality; the current position and the current orientation of the head-mounted display, and consequently that of the user, are now based on the position and the orientation of the head-mounted display in the base station. The removal of the head-mounted display can be detected, for example, by means of the display position detection device.

The display position detection device can be located inside the head-mounted display or in an external device such as the base station. However, it is also conceivable that the display position detection device is located in a separate data center. It is further conceivable that the base station is arranged on the vehicle.

The display position detection device can be configured as follows: so-called "outside-in-tracking" can be used, in which a position sensor is separate and arranged outside of the head-mounted displays. For this purpose, markers can be attached to the head-mounted displays of the passengers. The position sensor can track the movement of the markers, whereby the position of the head-mounted display can be calculated and transmitted to the VR device. The orientation of the head-mounted display can be determined using components such as gyro, acceleration and/or magnetic sensors which are installed today in very large numbers, for example in smartphones. These components are built into the head-mounted display.

In addition, so-called "inside-out tracking" can be used, in which the position sensor is arranged on the head-mounted display. Here, too, markers can be used, which are attached to fixed objects in the amusement ride, for example to stairs or walls.

Synchronization is independent of the orientation and position of the user's head. The immersion that can be achieved with the proposed synchronization device is reproducibly high. Since the user does not need to assist with synchronization, the synchronization can be carried out faster and without the risk of incorrect operation. Depending on the configuration, the synchronization device and/or the head-mounted display communicate in particular wirelessly with an external VR device, which generates the virtual reality, or the VR device is integrated in the head-mounted display.

According to another embodiment, the base station has presence detection means with which it can be detected whether the head-mounted display is stored in the base station and when the head-mounted display is removed from the base station. The display position detection device can also recognize that the head-mounted display is removed from the base station, but for this it must always be activated. The presence detection means can comprise, for example, a reed contact which switches when the head-mounted display is removed from the base station and thereby activates the synchronization device and the display position detection device. The synchronization device can therefore be operated in a more energy-efficient manner and with a smaller data volume.

In a further developed embodiment, the base station can have a charging device for charging the head-mounted display. The charging device can be designed in such a way that contact is made with the voltage source when the head-mounted display is placed in the base station. This ensures that the head-mounted display is always sufficiently charged without additional steps for charging the head-mounted display having to be carried out. The charging device can also be used as a presence detection means, since removal from the charging device can be detected and this information used accordingly.

An embodiment of the invention relates to an amusement ride, in particular a roller coaster, comprising a route on which at least one vehicle is movably arranged, the vehicle being designed to accommodate at least one passenger, a VR device with which a virtual reality corresponding to a journey of the passenger with the vehicle along the route can be generated and can be represented on a head-mounted display assigned to the passenger, a vehicle position detection device for detecting the position of the vehicle on the route, and a synchronization device according to one of the preceding embodiments, the amusement ride being set up in such a way that the virtual reality is synchronized with the position and the orientation of the head-mounted display as soon as the head-mounted display is removed from the base station, and the virtual reality, taking into account the position of the vehicle on the route and the position and the orientation of the head-mounted display in relation to the base station, being shown on the head-mounted display.

The technical effects and advantages that can be achieved with the proposed amusement ride correspond to those that have been discussed for the present synchronization device. Due to the fact that the synchronization of the head-mounted display with the virtual reality is carried out independently of the behavior of the passenger, corresponding explanations and instructions can be omitted. Incorrect operation and renewed synchronization can be avoided, which means that the amusement ride can be operated at a higher throughput. In addition, personnel expenses decrease, so that the proposed amusement ride can be operated much more economically than conventional amusement rides of this type.

The removal of the head-mounted display can be detected by the display position detection device and/or by a presence detection means.

A further development of the amusement ride is characterized in that the synchronization device and/or the base station is arranged on the vehicle. The passenger is not disturbed by the head-mounted display when getting on and off. The likelihood that the head-mounted display will be damaged or lost when getting on and off is reduced.

According to a further development, the vehicle has at least two passenger receptacles for accommodating one passenger each, a head-mounted display being assigned to each passenger receptacle. In order to achieve a high level of immersion, the position of the head-mounted display, and consequently the passenger, in relation to the vehicle, must also be taken into account. In the case of long vehicles in particular, the passengers who are sitting in the first row pass through a certain section of the route earlier than passengers who are sitting in the last row. This time difference must be taken into account in the virtual realities shown for the respective passengers. Although the display position detection device can also determine the position of the display in relation to the vehicle, the assignment of a head-mounted display to a passenger receptacle has the advantage that this determination can be omitted. The computing power that must be performed by the display position detection device can be reduced.

According to a further development, the head-mounted display is connected to the base station by means of a cable. At least on the priority date of this application, far higher data volumes can be transmitted via a cable than via a wireless connection. In addition, data transmission using a cable is less sensitive to external influences. The cable can be designed such that, in addition to data transmission, it also serves as a protection against loss, for example in the event that the head-mounted display should slide off the head of the passenger during the journey. In addition, the cable can also serve as protection against the conscious or unconscious taking away of the head-mounted display by the passenger after the end of the journey. Furthermore, a heavy battery within the head-mounted display can be dispensed with and wearing comfort can be increased.

In a further development of the ride, it is envisaged that the synchronization device is arranged outside the vehicle. Equipping the vehicles with such a synchronization device is usually more complex than installing the synchronization device outside the vehicles. In addition, the weight of the vehicles in this embodiment is not increased by the synchronization device. Faulty head-mounted displays can be replaced without having to have access to the vehicle, thereby avoiding delays in the operation of the vehicle. It is possible to put the head-mounted display on and take it off outside the vehicle before and after the journey, so that the passenger does not have to spend the time required for this in the vehicle. As a result, the throughput of the ride can be increased. This design makes it very clear that the synchronization of the head-mounted display can take place at a time that is offset from the start of the display of the virtual reality.

A further development of the amusement ride is characterized in that the VR device is set up in such a way that a virtual reality corresponding to the position and orientation of the head-mounted display outside the vehicle can be generated and displayed on the head-mounted display assigned to the passenger. In this design the virtual reality is not only limited to the route. Rather, the areas of the amusement ride adjacent to the route can also be integrated into the virtual reality. This increases the experience for the passenger and possible waiting times can be bridged in a fun way for the passenger. In addition, the virtual reality can be set up in such a way that a specific passenger who carries a specific head-mounted display is directed to a specific passenger receptacle. In some amusement rides, some passenger receptacles are not accessible to all passengers. For example, passengers with walking difficulties who need support when boarding and alighting and who are to be led to the station via ramps can be directed to a specific passenger receptacle with a correspondingly identified head-mounted display, where an employee of the amusement ride can assist the passenger.

One design of the invention relates to a method for operating, in particular, an amusement ride such as a roller coaster, according to one of the previous embodiments, with a synchronization device according to one of the previously explained embodiments, comprising the following steps:
  generating a virtual reality corresponding to a journey of a passenger with the vehicle along the route by means of a VR device,
  detecting the position of the vehicle on the route by means of a vehicle position detection device,
  detecting the position and orientation of the head-mounted display by means of a display position detection device,
  displaying the virtual reality on a head-mounted display assigned to the passenger,
  synchronizing the virtual reality with the position and orientation of the head-mounted display as soon as the head-mounted display is removed from the base station, the virtual reality, taking into account the position of the vehicle on the route and the position and orientation of the head-mounted display with respect to the base station, being displayed on the head-mounted display.

The technical effects and advantages that can be achieved with the proposed method correspond to those that have been discussed for the present amusement ride. Due to the fact that the synchronization of the head-mounted display with the virtual reality is carried out independently of the behavior of the passenger, corresponding explanations and instructions can be omitted. Incorrect operation and renewed synchronization can be avoided, which means that the amusement ride can be operated at a higher throughput. In addition, personnel expenses decrease, so that the proposed amusement ride can be operated much more economically than conventional amusement rides of this type.

The removal of the head-mounted display can be detected by the display position detection device and/or by a presence detection means.

At this point it should be pointed out that the present synchronization device and the proposed method can also be used independently of an amusement ride. The present synchronization device and the proposed method can be used in theme parks, fitness studios or escape rooms of leisure and games centers, as is shown, for example, in WO 2013/050473 A1.

In a further design the method can include the step of displaying the virtual reality on the head-mounted display as soon as the display position detection device detects that the head-mounted display is within a selectable area of the amusement ride. As already mentioned, the virtual reality can not only be limited to the route, but can also extend to areas adjacent to the route. In this design the representation of the virtual reality is started as soon as the head-mounted display, and consequently the passenger, are within the selectable area. The selectable area can be changed flexibly, for example when the content of the virtual reality is changed. It should be noted that the selectable area can coincide with the vehicle.

A further design of the method comprises the following steps:
  displaying the virtual reality on the head-mounted display as soon as the vehicle position detection device detects that the vehicle is moving along the route.

Although the display position detection device can also detect that the vehicle is moving along the route with the head-mounted display, the computing power to be performed for this by the display position detection device can be reduced if the movement of the vehicle along the route is detected by the vehicle position detection device. For this purpose, the vehicle position detection device can also use the start signal for the vehicle, which is output by the controller or by the operator of the amusement ride, for the start of the representation of the virtual reality.

BRIEF DESCRIPTION OF THE DRAWINGS

Exemplary embodiments of the invention are explained in more detail below with reference to the accompanying drawings. In the drawings.

DETAILED DESCRIPTION

Figure 1:
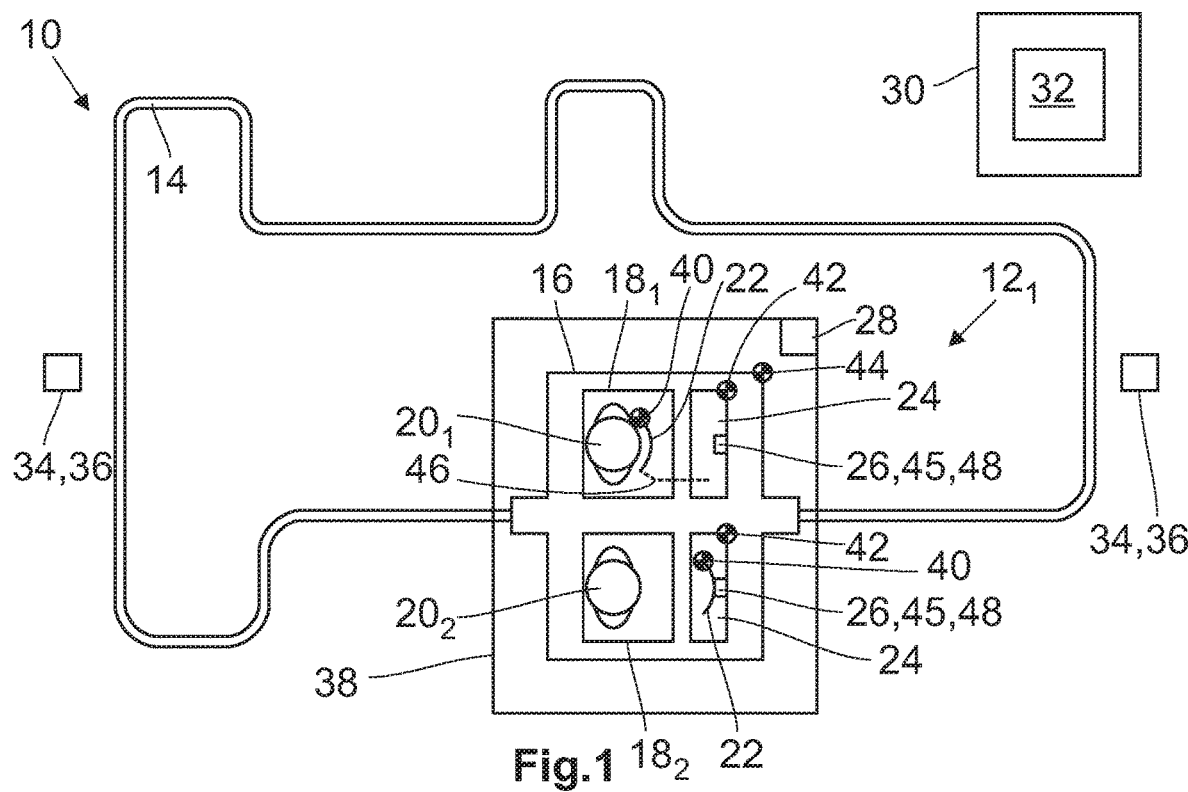
FIG. 1 shows an amusement ride with a first embodiment of a synchronization device according to the invention.

FIG. 1 shows an amusement ride 10 with a first embodiment of a synchronization device $12_1$ according to the invention, based on a basic illustration. The amusement ride 10 comprises a route 14, along which a vehicle 16 can be moved by means of drive means, not illustrated. Of course, the amusement ride 10 can have more than one vehicle 16. In the illustrated embodiment example the amusement ride 10 is a roller coaster. The vehicle 16 has a first passenger receptacle $18_1$ and a second passenger receptacle $18_2$, in which a first passenger $20_1$ and a second passenger $20_2$ can be accommodated, respectively.

The synchronization device $12_1$ comprises at least one head-mounted display 22 with which a virtual reality can be displayed. Furthermore, the synchronization device has a base station 24 for storing the head-mounted display 22. A base station 24 is provided in the vehicle 16 for each passenger receptacle $18_1$, $18_2$. The base station 24 is provided with receiving means 26, which ensure that the head-mounted display 22 can only be stored in the base station 24 in a defined position and orientation.

In addition, the synchronization device $12_1$ comprises a display position detection device 28 with which the position and the orientation of the head-mounted display 22 can be detected.

The amusement ride 10 also has a VR device 30, with which a virtual reality can be generated. For this purpose, the VR device 30 has a computing unit 32. The VR device 30 communicates wirelessly with the synchronization device $12_1$ and the head-mounted display 22, which the passenger 20 wears much like glasses.

Furthermore, the amusement ride 10 is equipped with a vehicle position detection device 34, which is used to detect the position of the vehicle 16 on the route 14. The vehicle position detection device 34 has distance sensors 36, with which the position of the vehicle 16 on the route 14 is detected and transmitted to the computing unit 32, which takes the position of the vehicle 16 on the route 14 into account when generating the virtual reality.

The amusement ride 10 is operated in the following way: In the initial state, the head-mounted display 22 is stored in the base station 24. As mentioned, the receiving means 26 of the base station 24 are designed such that the head-mounted display 22 can only be stored in the base station 24 in a defined position and orientation. The head-mounted display 22 is correspondingly stored in the base station 24 assigned to the second passenger receptacle $18_2$.

The amusement ride 10 has a station 38 which is traversed by the route 14 and in which the vehicle 16 is stopped and started again. Passengers can get in and out of vehicle 16 at the station 38. As soon as the passengers have taken a seat in the passenger receptacles $18_1$, $18_2$, they can remove and put on the head-mounted display 22 assigned to their passenger receptacle $18_1$, $18_2$ from the base station 24. It can be seen in FIG. 1 that the first passenger $20_1$ has already put on the head-mounted display 22 assigned to the first passenger receptacle $18_1$, while the head-mounted display 22 assigned to the second passenger receptacle $18_2$ is still in the base station 24.

The position and the orientation of the head-mounted display 22 can be described with a first coordinate system 40. The movement and the orientation of the base station 24 can be described with a second coordinate system 42, while the movement and the orientation of the vehicle 16 can be described with a third coordinate system 44.

In the example shown, the vehicle 16 can only move along the route 14 in a single manner, so that the orientation of the vehicle 16 is known for each position on the route 14. With the vehicle position detection device 34, the current position of the vehicle 16, and consequently the speed, can be determined and taken into account by the VR device when generating the virtual reality.

Since the base station 24 is fixedly mounted on the vehicle 16, the second coordinate system 42 and the third coordinate system 44 are in a fixed relationship to one another, which does not change.

As long as the head-mounted display 22 is in the base station 24, the first coordinate system 40 is also in a fixed relationship to the second and third coordinate systems 42, 44. However, this changes as soon as the passenger 20 concerned removes the head-mounted display 22 from the base station 24. The removal from the base station 24 can be registered by the display position detection device 28, although the base station 24 has a presence detection means 45 which is integrated in the receiving means 26 and is implemented, for example, in the form of a reed contact, and which generates a notification signal as soon as the head-mounted display 22 is removed from the base station 24. The notification signal is sent to the computing unit 32 of the VR device 30. At the moment of removal, the virtual reality is synchronized with the position and orientation of the head-mounted display 22 in the base station 24 and the subsequent positions and orientations of the head-mounted display 22 are based on the position and orientation of the head-mounted display 22 in the base station 24. Removal from the base station 24 can also be used to start the representation of the virtual reality in the head-mounted display 22, but this can also be done at a later point in time, for example as soon as the vehicle position detection device 34 detects that the vehicle 16 is moving along the route 14. Corresponding signals are also transmitted to the computing unit 32 of the VR device 30 for this purpose. Other triggering events can also be used for this, for example the closing of safety bars (not shown here), a release signal which is emitted by an employee of the amusement ride 10, or a start signal which is emitted by the operator of the amusement ride 10.

Assistance of the passenger 20 during the synchronization is not necessary. All changes in the position and the orientation of the head-mounted display 22 are taken into account by the VR device 30 when representing the virtual reality. On the basis of the signals from the vehicle position detection device 34, the position of the vehicle 16 on the route 14 is also taken into account in the representation of the virtual reality by the VR device 30, so that high immersion can be achieved.

As soon as the journey has ended, the passengers 20 take off the head-mounted display 22, put it back in the base station 24 and leave the vehicle 16 via the station 38. Now further passengers 20 can use the amusement ride 10 in the manner described.

FIG. 1 also shows that the head-mounted display 22 is connected to the base station 24 via a cable 46. The cable 46 can be used for data transmission, for securing the head-mounted display 22 or for charging the head-mounted display 22. In the example shown, a charging device 48 is however integrated in the receiving means 26 of the base station 24, so that the head-mounted display 22 can be charged as soon as the head-mounted display 22 is stored in the base station 24.

Figure 2:
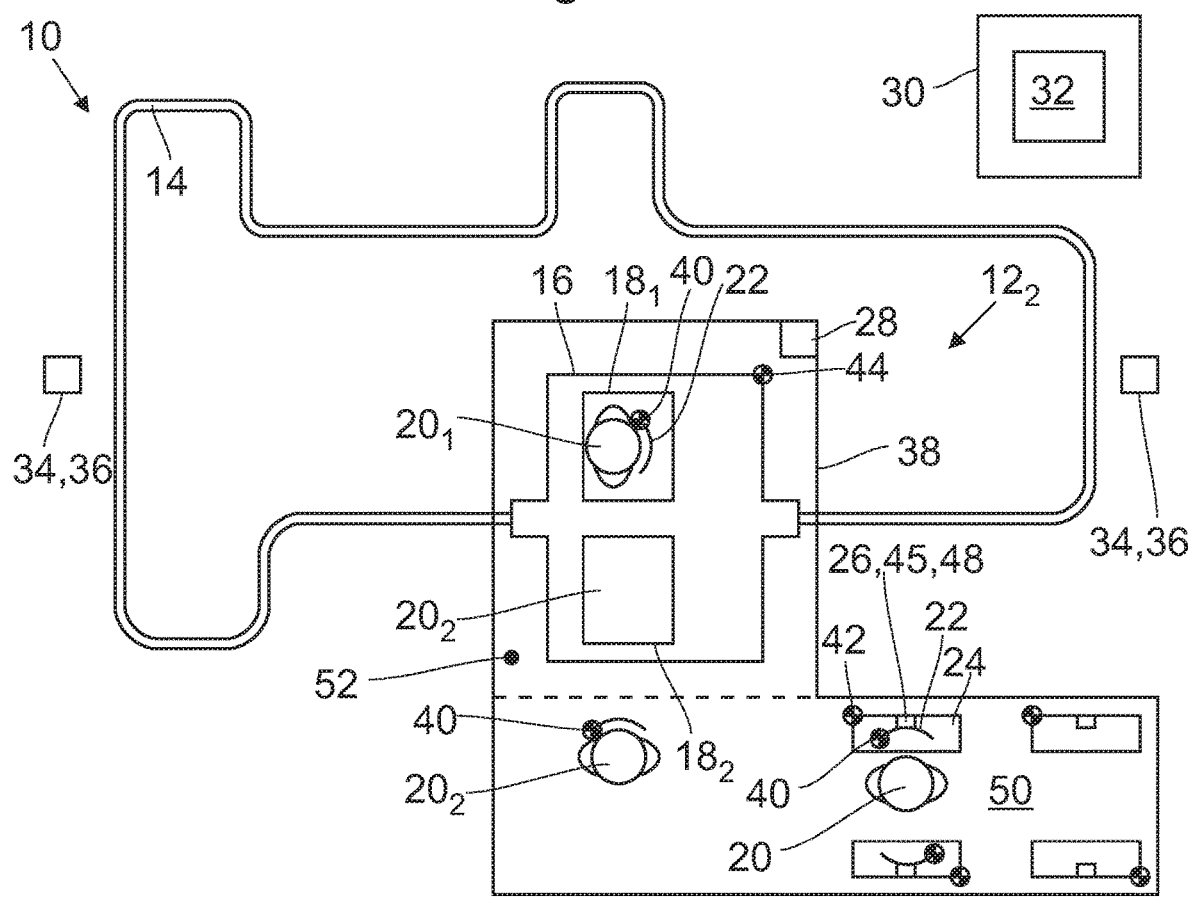
FIG. 2 shows an amusement ride with a second embodiment of a synchronization device according to the invention, each based on a basic plan view.

FIG. 2 shows an amusement ride 10 with a second embodiment of a synchronization device $12_2$ according to the invention. The main difference from the amusement ride 10 with a synchronization device $12_1$ according to the first embodiment is that the base stations 24 are arranged outside the vehicle 16, for example in a waiting area 50 of the amusement ride 10 adjoining the station 38. However, the basic structure and the basic mode of operation of the synchronization device $12_2$ according to the second embodiment do not differ from that of the first embodiment. As the base stations 24 are however arranged outside the vehicles 16 and do not change their position, the second and third coordinate systems 42, 44 are no longer in a fixed, unchangeable relationship, as is the case with the first embodiment of the synchronization device $12_1$.

In the second embodiment of the synchronization device $12_2$, synchronization is also carried out as soon as the passenger 20 removes the head-mounted display 22 from the base station 24. However, since the passenger 20 still has to travel a certain distance to the station 38 and to the vehicle 16, it cannot be ruled out that he is already putting on the head-mounted display 22 before reaching the station 38 and before boarding the vehicle 16, as the second passenger $20_2$ did. In order to nevertheless give the passenger the necessary orientation, either the real world or a virtual reality extending beyond the vehicle 16 can be shown. In the case of virtual reality that goes beyond the vehicle 16, obstacles in the real world are taken into account in such a way that they do not pose any danger to the passenger 20 who has put on the head-mounted display 22. For example, virtual reality can only be shown when the passenger 20 is within a selectable area 52 of the amusement ride 10, for example inside the station 38 or inside the vehicle 16.

LIST OF REFERENCE NUMERALS 10 amusement ride
12 synchronization device
$12_1$ first synchronization device
$12_2$ second synchronization device
14 route
16 vehicle
18 passenger receptacle
$18_1$ first passenger receptacle
$18_2$ second passenger receptacle
20 passenger
$20_1$ first passenger
$20_2$ second passenger
22 head-mounted display
24 base station
26 receiving means
28 display position detection device
30 VR device
32 computing unit
34 vehicle position detection device
36 distance sensor
38 station
40 first coordinate system
42 second coordinate system
44 third coordinate system
45 presence detection means
46 cable
48 charging device
50 waiting area
52 selectable area

The invention claimed is:

1. A synchronization device for synchronizing head-mounted displays (22) with a virtual world, comprising:
at least one head-mounted display (22), with which a virtual reality generated by a virtual reality (VR) device (30) can be represented;
a base station (24) for storing the head-mounted display (22), the base station (24) having receiving means with which the head-mounted display (22) can be stored in a defined position and orientation in the base station (24);
a display position detection device (28) for detecting the position and orientation of the head-mounted display (22); and
the synchronization device (12) being set up in such a way that the virtual reality is synchronized with the head-mounted display (22), taking into account the position and orientation of the head-mounted display (22) detected by the display position detection device (28) in relation to the position and orientation of the head-mounted display (22) in the base station (24), as soon as the head-mounted display (22) is removed from the base station (24).

2. The synchronization device according to claim 1, characterized in that the base station (24) has presence detection means (45), capable of detecting whether the head-mounted display (22) is stored in the base station (24) and when the head-mounted display (22) is removed from the base station (24).

3. The synchronization device according to claim 1, characterized in that the base station (24) has a charging device (48) for charging the head-mounted display (22).

4. The synchronization device according to claim 1, characterized in that the virtual world comprises an amusement ride (10).

5. An amusement ride (10), comprising:
a route (14) on which at least one vehicle (16) is movably arranged, the vehicle (16) being designed to accommodate at least one passenger (20);
a VR device (30), with which a virtual reality corresponding to a journey of the passenger (20) with the vehicle (16) along the route (14) can be generated and can be represented on a head-mounted display (22) assigned to the passenger (20);
a vehicle position detection device (34) for detecting the position of the vehicle (16) on the route (14); and
a synchronization device (12) according to claim 1, the amusement ride (10) being set up in such a way that:
the virtual reality is synchronized with the position and the orientation of the head-mounted display (22) as soon as the head-mounted display (22) is removed from the base station (24), and
the virtual reality, taking into account the position of the vehicle (16) on the route (14) and the position and orientation of the head-mounted display (22) with respect to the base station (24), being displayed on the head-mounted display (22).

6. The amusement ride (10) according to claim 5, characterized in that the synchronization device and/or the base station (24) is arranged on the vehicle (16).

7. The amusement ride (10) according to claim 6, characterized in that the vehicle (16) has at least two passenger receptacles (18) for accommodating one passenger (20) each and that ones of the head-mounted displays (22) is assigned to each passenger receptacle (18).

8. The amusement ride (10) according to claim 7, characterized in that the head-mounted display (22) is connected to the base station (24) by means of a cable (46).

9. The amusement ride (10) according to claim 5, characterized in that the synchronization device (12) is arranged outside the vehicle (16).

10. The amusement ride (10) according to claim 5, characterized in that the VR device (30) is set up in such a way that a virtual reality corresponding to the position and orientation of the head-mounted display (22) outside the vehicle (16) can be generated and displayed on the head-mounted display (22) assigned to the passenger (20).

11. The amusement ride (10) according to claim 5, wherein the amusement ride is a roller coaster.

12. A method for operating, an amusement ride (10) having a route (14) on which at least one vehicle (16) is movably arranged, the vehicle (16) being designed to accommodate at least one passenger (20); and
a vehicle position detection device (34) for detecting the position of the vehicle (16) on the route (14), and a synchronization device (12) comprising the following steps:
generating a virtual reality corresponding to a journey of a passenger (20) with the vehicle (16) along the route (14) by means of a virtual reality (VR) device (30),
detecting the position of the vehicle (16) on the route (14) by means of a vehicle position detection device (34),
detecting the position and orientation of the head-mounted display (22) by means of a display position detection device (28),
displaying the virtual reality on a head-mounted display (22) assigned to the passenger (20) depending on the position and orientation of the head-mounted display (22) in the vehicle (16),
synchronizing the virtual reality with the position and the orientation of the head-mounted display (22) as soon as the head-mounted display (22) is removed from the base station (24), the virtual reality, taking into account the position of the vehicle (16) on the route (14) and the position and orientation of the head-mounted display (22) in relation to the base station (24), being displayed on the head-mounted display (22).

13. The method according to claim 12, comprising the following step:
Displaying the virtual reality on the head-mounted display (22) as soon as the display position detection device (28) detects that the head-mounted display (22) is within a selectable area (52) of the amusement ride (10).

14. The method according to claim 12, comprising the following step:
displaying the virtual reality on the head-mounted display (22) as soon as the vehicle position detection device (34) detects that the vehicle (16) is moving along the route.

15. The method according to claim 12, wherein the amusement ride is a roller coaster.

16. A synchronization device for synchronizing head-mounted displays (22) with a virtual world, comprising:
at least one head-mounted display (22), with which a virtual reality generated by a virtual reality (VR) device (30) can be represented;
a base station (24) for storing the head-mounted display (22), the base station (24) having receiving means (26), the receiving means (26) having a configuration to store the head-mounted display (22) in the base station 24 in a defined position and orientation with which the head-mounted display (22) in a defined position and orientation in the base station (24), at least one of the head-mounted display (22) and the receiving means (26) generating a notification signal on removal of the head-mounted display (22) is removed from the base station (24);
a display position detection device (28) for detecting the position and orientation of the head-mounted display (22); and
the synchronization device (12) being set up in such a way that the virtual reality is synchronized with the head-mounted display (22), taking into account the position and orientation of the head-mounted display (22) detected by the display position detection device (28) in relation to the position and orientation of the head-mounted display (22) in the base station (24), as soon as the head-mounted display (22) is removed from the base station (24) after receiving the notification signal.

17. The synchronization device according to claim 16, characterized in that the virtual world comprises an amusement ride (10).

* * * * *